United States Patent
Matsumoto

(10) Patent No.: US 8,351,839 B2
(45) Date of Patent: Jan. 8, 2013

(54) MEDIUM TRANSPORTING APPARATUS AND IMAGE FORMING APPARATUS HAVING THE SAME

(75) Inventor: Keigo Matsumoto, Tokyo (JP)

(73) Assignee: Oki Data Corporation, Tokyo (JP)

( * ) Notice: Subject to any disclaimer, the term of this patent is extended or adjusted under 35 U.S.C. 154(b) by 699 days.

(21) Appl. No.: 12/457,817

(22) Filed: Jun. 23, 2009

(65) Prior Publication Data

US 2009/0324311 A1    Dec. 31, 2009

(30) Foreign Application Priority Data

Jun. 30, 2008  (JP) .................................. 2008-170956

(51) Int. Cl.
G03G 15/00   (2006.01)
G03G 21/00   (2006.01)
B65H 5/36    (2006.01)

(52) U.S. Cl. .......................... 399/361; 399/363; 399/381
(58) Field of Classification Search .................. 399/361, 399/363, 381
See application file for complete search history.

(56) References Cited

U.S. PATENT DOCUMENTS

| 4,569,611 | A | * | 2/1986 | Watanabe et al. | ............. 400/624 |
| 5,087,142 | A | * | 2/1992 | Suzuki et al. | ................. 400/616 |
| 5,434,658 | A | * | 7/1995 | Kwon | ............................ 399/328 |
| 5,771,433 | A | * | 6/1998 | Kimijima | ....................... 399/369 |
| 6,705,786 | B2 | * | 3/2004 | Trovinger | .................. 400/645.3 |
| 7,747,212 | B2 | * | 6/2010 | Yamamoto | ..................... 399/408 |
| 7,822,378 | B2 | * | 10/2010 | Yamada et al. | ................ 399/385 |
| 2008/0085140 | A1 | * | 4/2008 | Kajiyama et al. | .............. 399/361 |

FOREIGN PATENT DOCUMENTS

| JP | 55066432 A | * | 5/1980 |
| JP | 58224932 A | * | 12/1983 |
| JP | 62100348 A | * | 5/1987 |
| JP | 63071064 A | * | 3/1988 |
| JP | 63-160861 A | | 7/1988 |
| JP | 03128838 A | * | 5/1991 |
| JP | 04106046 A | * | 4/1992 |
| JP | 04-153056 A | | 5/1992 |
| JP | 4-70841 | | 6/1992 |
| JP | 07172619 A | * | 7/1995 |
| JP | 07291479 A | * | 11/1995 |
| JP | 07315633 A | * | 12/1995 |
| JP | 10025039 A | * | 1/1998 |
| JP | 10-171199 | | 6/1998 |
| JP | 2003026353 A | * | 1/2003 |
| JP | 2007131455 A | * | 5/2007 |

* cited by examiner

*Primary Examiner* — Judy Nguyen
*Assistant Examiner* — Nguyen Q Ha
(74) *Attorney, Agent, or Firm* — Rabin & Berdo, P.C.

(57) ABSTRACT

A medium transporting apparatus includes a first transport member and a movable guide member. The first transport member transports a medium in the medium transport direction. The movable guide member comes into contact with and guides the medium transported by the first transport member along a medium transport path. The movable guide member is also movable from a first position to a second position downstream of the first position in the medium transport direction.

26 Claims, 20 Drawing Sheets

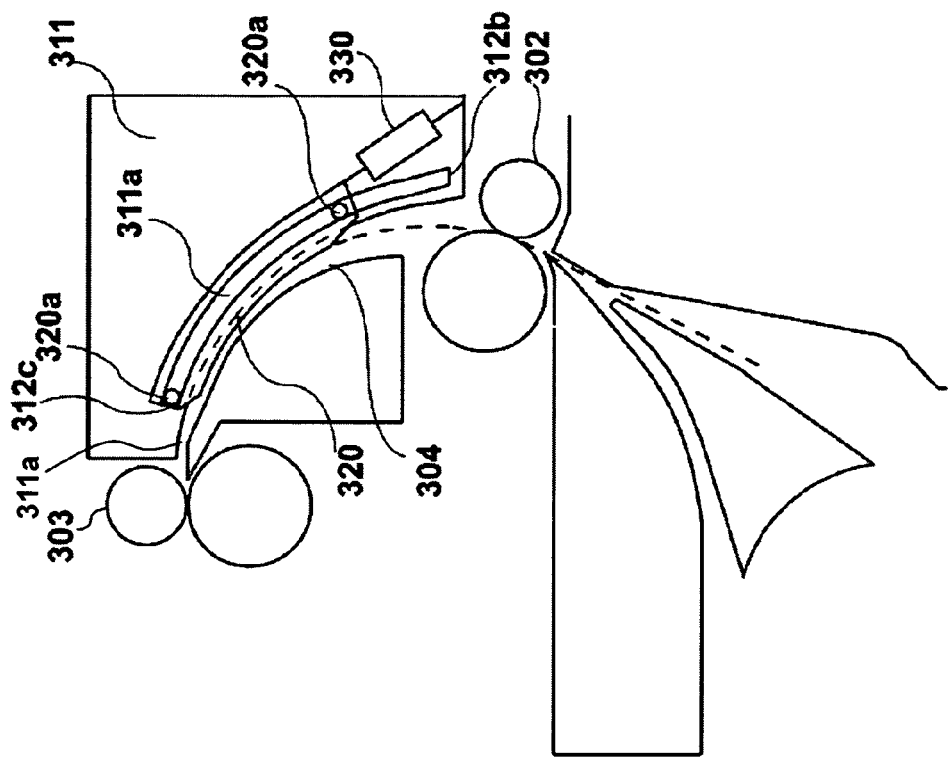
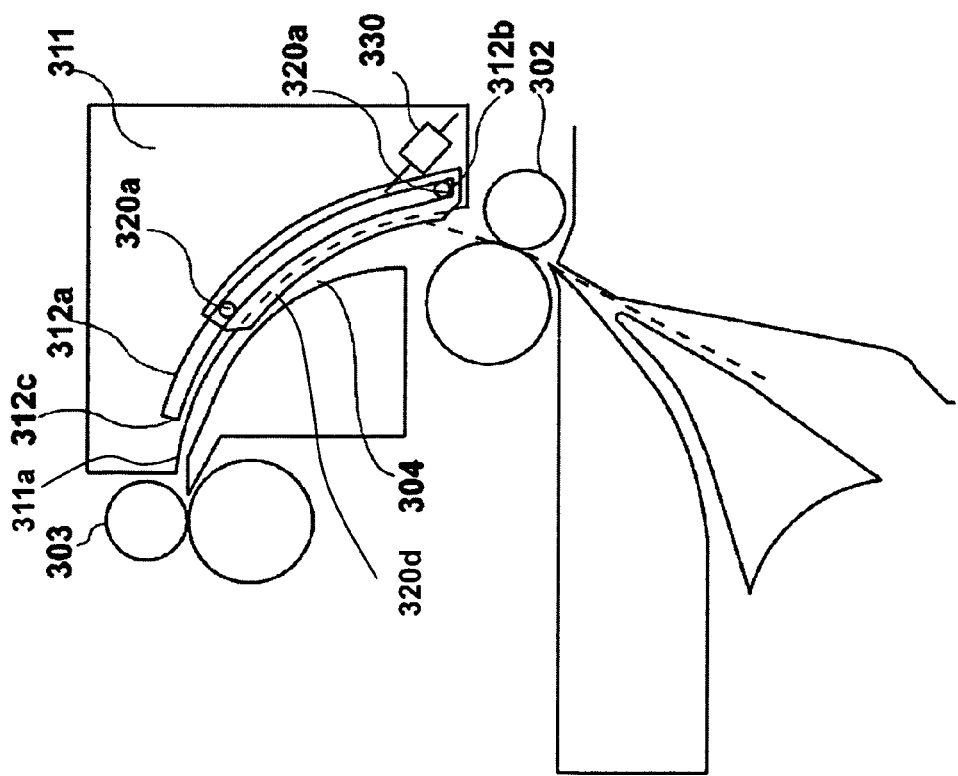

MEDIUM TRANSPORTING APPARATUS AND IMAGE FORMING APPARATUS HAVING THE SAME

CROSS REFERENCE TO RELATED APPLICATIONS

This application claims priority based on 35 USC 119 from prior Japanese Patent Application No. P2008-170956 filed on Jun. 30, 2008, the entire contents of which are incorporated herein by reference.

BACKGROUND OF THE INVENTION

1. Field of the Invention

The invention relates to a medium transporting apparatus for use in an image forming apparatus such as a printer, a copier, a facsimile machine and a multifunction printer (MFP), and also relates to the image forming apparatus having the medium transporting apparatus.

2. Description of the Related Art

A conventional image forming apparatus such as a printer includes a sheet feeding mechanism, an image-forming unit, a transfer unit and a fixing unit. The image-forming unit forms a toner image in accordance with print data. The transfer unit transfers the toner image to a sheet fed by the sheet feeding mechanism. The sheet with the toner image thereon is advanced to the fixing unit where the toner image is fused into a permanent image on the sheet, and is then discharged from the image forming apparatus.

The sheet feeding mechanism includes a feed roller, a separator and a pressure member. The feed roller feeds a sheet accommodated in a sheet cassette. The separator is provided in opposition to the feed roller. The pressure member urges the separator against the feed roller. A guide member is disposed downstream of the feed roller and guides the sheet fed by the feed roller in a predetermined direction. A pair of transport rollers is provided further downstream of the guide member and transports the sheet guided by the guide member.

When a feed motor rotates the feed roller at a predetermined speed, a sheet is picked up from a sheet loading plate in the sheet cassette and is advanced to a nip portion formed between the feed roller and the separator. If a plurality of sheets are picked up from the sheet loading plate at the same time, they are separated one-by-one at the nip portion. Then, the sheet is advanced to the transport rollers along the guide member. Japanese Patent Laid-Open No. 10-171199 discloses one such sheet feeding mechanism. With the sheet feeding mechanism disclosed in the patent document, the guide member is U-shaped so as to reverse the direction of sheet transport, thereby miniaturizing the image forming apparatus.

In the aforementioned mechanism, however, since a front end of the sheet fed by the feed roller abuts a surface of the guide member at a steep angle, a large frictional force acts on the front end of the sheet. Therefore, the sheet is unable to slide smoothly on the surface of the guide member. This might cause adverse effects on the transport of the sheet.

SUMMARY OF THE INVENTION

An object of the invention is to provide a medium transporting apparatus and an image forming apparatus capable of transporting medium stably.

A medium transporting apparatus includes a first transport member and a movable guide member. The first transport member transports a medium. The movable guide member comes into contact with and guides the medium transported by the first transport member along a medium transport path. The movable guide member is also movable from a first position to a second position downstream of the first position in the medium transport direction.

An image forming apparatus includes a medium transporting apparatus, an image-forming section, a transfer unit and a fixing unit. The medium transporting apparatus transports a medium. The image-forming section forms a toner image. The transfer unit transfers the toner image to the medium. The fixing unit fuses the toner image transferred to the medium, into a permanent image. The medium transporting apparatus includes a first transport member and a movable guide member. The first transport member transports the medium. The movable guide member comes into contact with and guides the medium transported by the first transport member, along a medium transport path. The movable guide member is also movable from a first position to a second position downstream of the first position in the medium transport direction.

A further scope of applicability of the invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will become more fully understood from the detailed description given hereinbelow and the accompanying drawings, which are given by way of illustration only, and thus do not limit the invention, and wherein:

FIG. 5A is a side view illustrating the movable guide member when it is at a first position;

FIG. 5B is a side view illustrating the movable guide member when it is at a second position;

DETAILED DESCRIPTION OF THE INVENTION

Preferred embodiments of the invention will be described in detail with reference to the accompanying drawings.

First Embodiment

<Construction>

Figure 1:
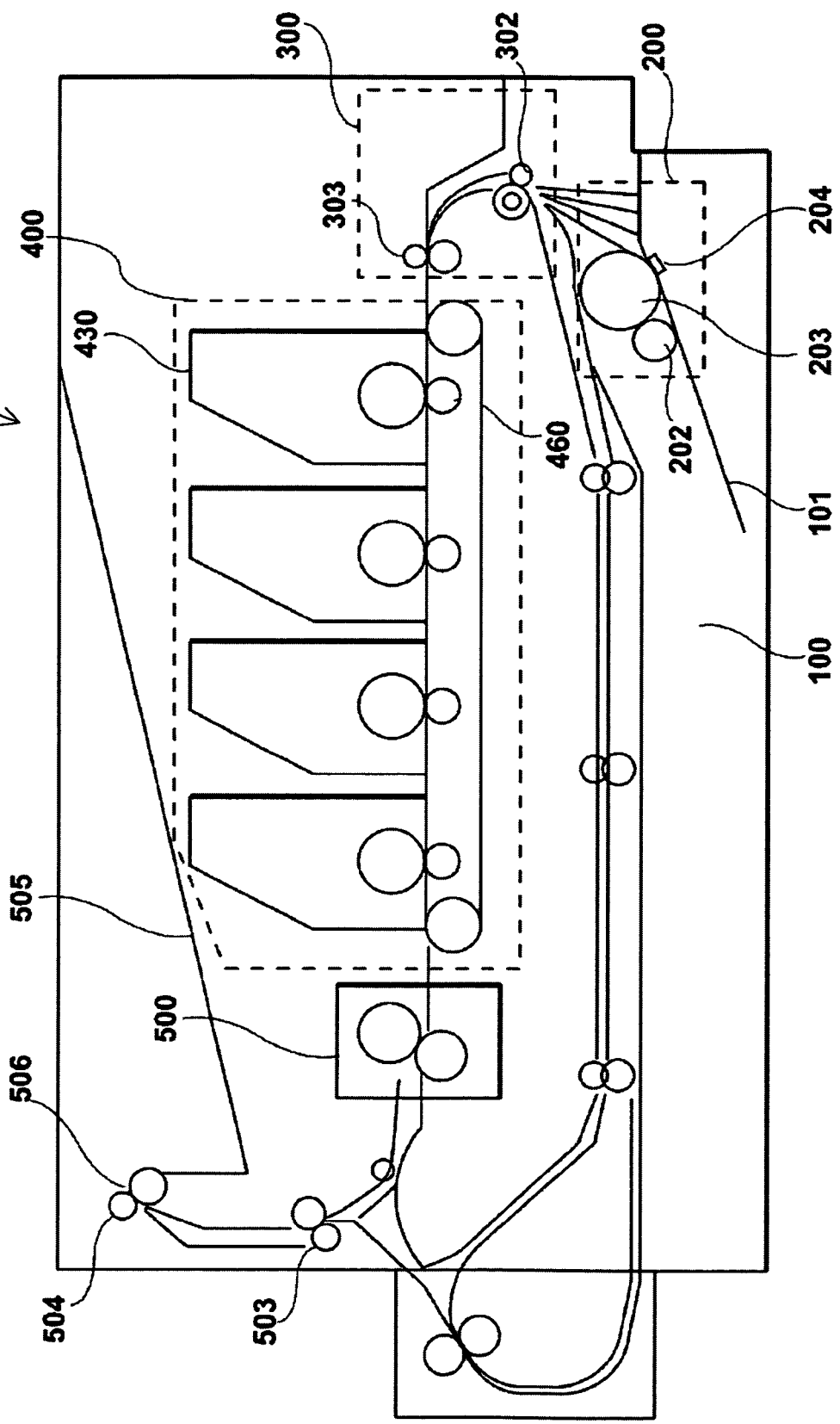
FIG. 1 is a schematic view illustrating a pertinent portion of an image forming apparatus according to a first embodiment of the invention.

FIG. 1 is a schematic view illustrating a pertinent portion of an image forming apparatus according to a first embodiment of the invention.

Referring to FIG. 1, the image forming apparatus 1 is an electrophotographic printer that forms an image in various colors. The image forming apparatus 1 includes a sheet cassette 100, a sheet feeding section 200, a sheet transport section 300, an image-forming section 400 and a fixing unit 500. The sheet cassette 100 accommodates a stack of sheets 101 (medium 101). The sheet feeding section 200 may be provided in the vicinity of the feeding side of the sheet cassette 100 to feed each sheet 101 accommodated in the sheet cassette 100 to the sheet transport section 300 on a sheet-by-sheet basis. The sheet feeding section 200 may include a pick-up roller 202, which is in pressure contact with the top surface of one sheet 101 when the sheet 101 is lifted to a predetermined height. The sheet feeding section 200 may further include a feed roller 203 and a separator 204, which separate one-by-one the sheets 101 picked up by the pick-up roller 202.

The sheet transport section 300 as a medium transporting apparatus transports the sheet 101 fed from the sheet feeding section 200 to the image-forming section 400. The sheet transport section 300 may include a pair of first transport rollers 302 as a first transport member and a pair of second transport rollers 303 as a second transport member.

The image-forming section 400 may include four image-forming units 430 arranged in series, which respectively form a yellow toner image, a magenta toner image, a cyan toner image and a black toner image, and a transfer unit 460, which transfers the toner images formed by image-forming units 430 to the sheet 101 by a coulomb force.

The fixing unit 500 fixes the toner image transferred to the sheet 101 by the transfer unit 460, onto the sheet 101 with heat and pressure. Two pairs of discharge rollers 503 and 504, downstream of the fixing unit 500, discharge the sheet 101 having the fixed toner image thereon to a sheet stacker 505 through a discharge opening 506.

Figure 2:
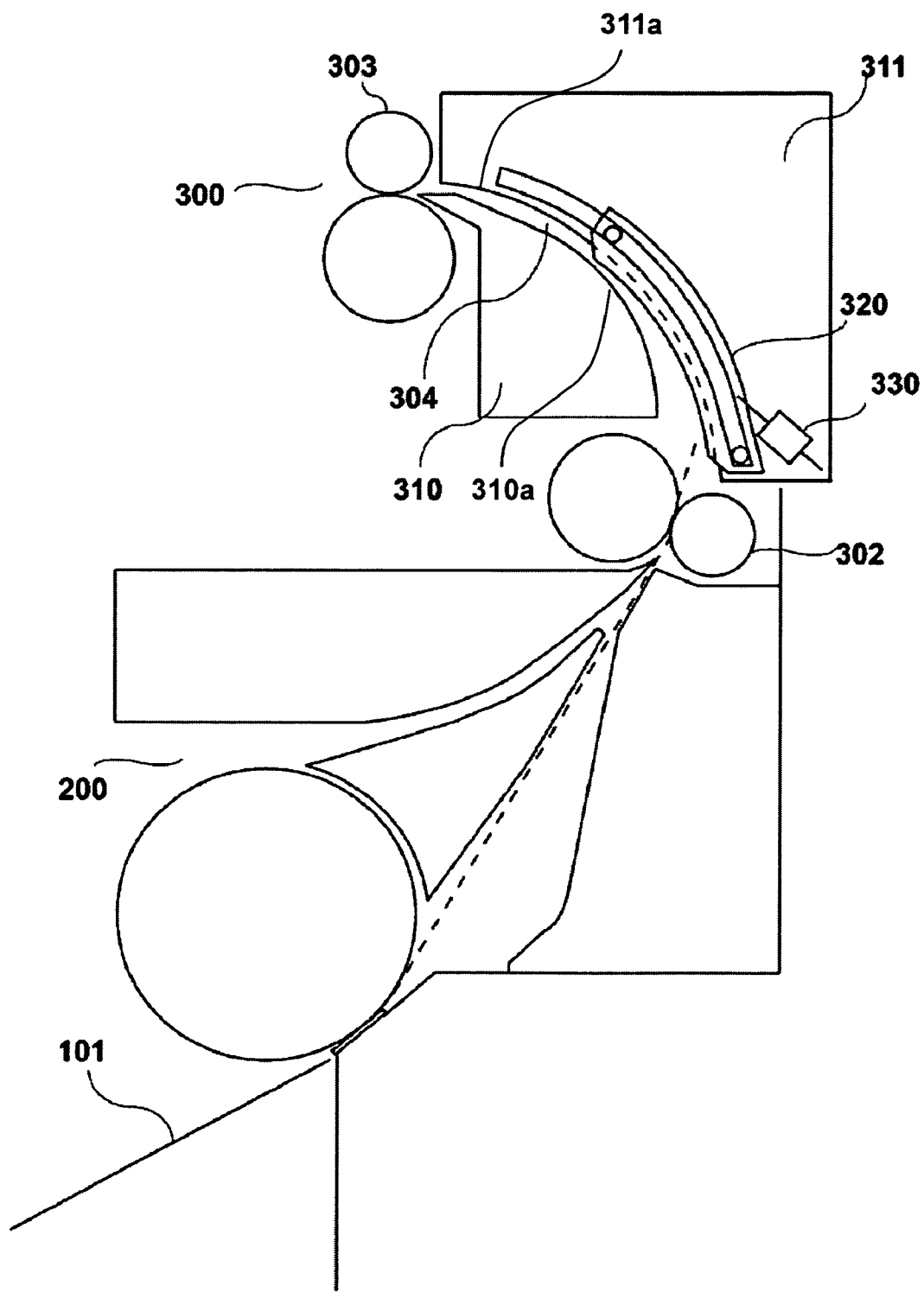
FIG. 2 is a side view illustrating a sheet transport section according to the first embodiment of the invention.

FIG. 2 is a side view illustrating the sheet transport section 300 of the first embodiment of the invention, which may include a lower guide member 310 (i.e., a second fixed guide member) and an upper guide member 311 (i.e., a first fixed guide member). The lower guide member 310 and the upper guide member 311 are fixedly attached to the main body, not shown, of the image forming apparatus 1, so that a sheet transport surface 310a of the lower guide member 310 and a sheet transport surface 311a of the upper guide member 311 are opposed to each other with a predetermined gap therebetween. The gap between the lower guide member 310 and the upper guide member 311 is defined as a sheet transport path 304 for transporting the sheet 101. Since the sheet transport surface 310a of the lower guide member 310 and the sheet transport surface 311a of the upper guide member 311 are both curved, the sheet transport path 304 is formed in an arcuate cross section. Therefore, the direction in which the sheet 101 is transported can be diverted greatly.

As described above, the pair of first transport rollers 302 may be disposed upstream of the sheet transport path 304, or in the vicinity of an inlet of the sheet transport section 300, and the pair of second transport rollers 303 may be disposed downstream of the sheet transport path 304, or in the vicinity of an outlet of the sheet transport section 300. When these transport rollers 302 and 303 are rotated by a driving source, not shown, the sheet 101 fed from the sheet feeding section 200 is transported along the sheet transport path 304 while being guided by the lower guide member 310 and the upper guide member 311.

A movable guide member 320 is slidably mounted to the upper guide member 311 along the sheet transport surface 311a. As illustrated in FIG. 2, the lower guide member 310 opposes the movable guide member 320 across the sheet transport path 304. A distance between the movable guide member 320 and the lower guide member 310 in a direction perpendicular to the sheet transport direction 304 gradually decreases along the sheet transport direction 304. The movable guide member 320 is urged to the upstream side in the sheet transport direction at all times by a spring 330 serving as a moving member. Through use of the spring 330, the movable guide member 320 can be urged in a stable manner.

Figure 3A:
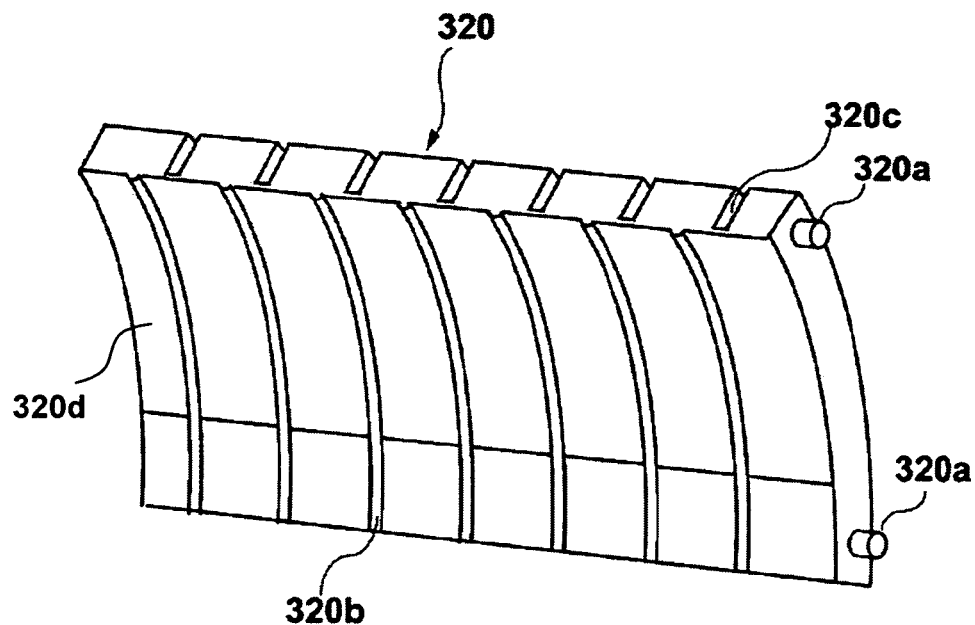
FIG. 3A is a perspective view illustrating a movable guide member as seen from the front.
Figure 3B:
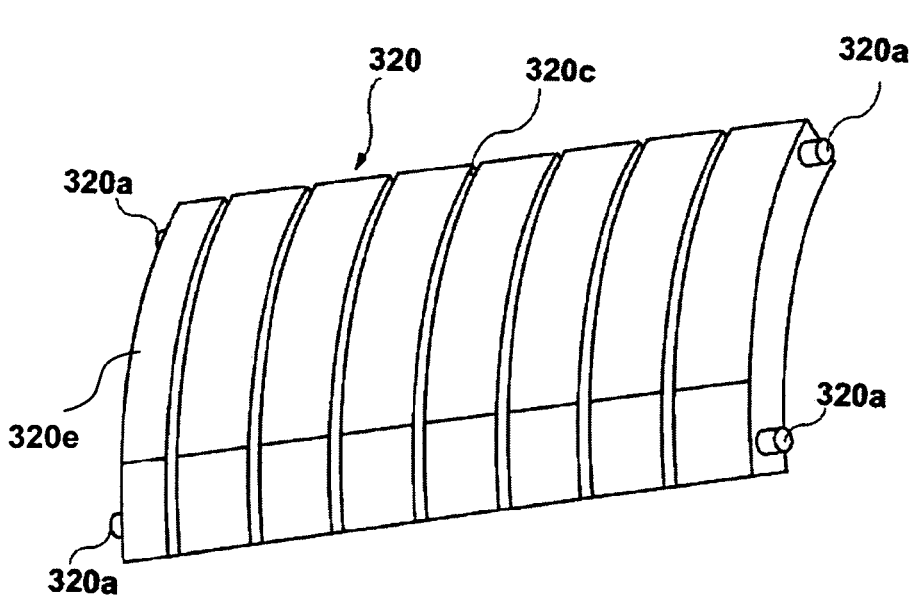
FIG. 3B is a perspective view illustrating the movable guide member as seen from the back.

FIGS. 3A and 3B are perspective views illustrating the movable guide member 320 as seen from the front and from the back, respectively. Referring to FIG. 3A, the movable guide member 320 is plate-like and is curved generally to follow the sheet transport surface 310a of the lower guide member 310 and the sheet transport surface 311a of the upper guide member 311. Ribs 320b are provided on a front surface 320d of the movable guide member 320 at predetermined intervals in a width direction, i.e. in a direction perpendicular to the sheet transport direction, so as to come into contact with the sheets 101 as they are transported along the transport path 304. The ribs 320b extend in the sheet transport direction and are effective to reduce the frictional resistance between the movable guide member 320 and the sheet 101. Referring to FIG. 3B, grooves 320c are provided on a back surface 320e of the movable guide member 320 at predetermined intervals in the width direction. Ribs 313, described later, of the upper guide member 311 slidably fit into the grooves 320c. Additionally, the movable guide member 320 is formed with projections 320a at its opposite ends.

Figure 18A:
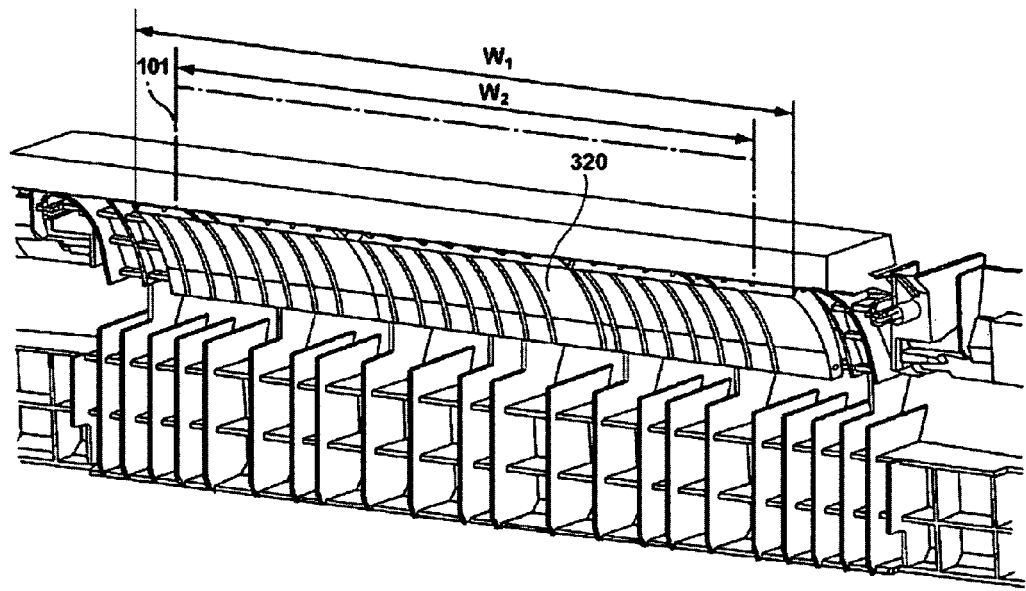
FIG. 18A is a perspective view illustrating an example of the sheet transport section, which has one movable guide member in a direction perpendicular to the sheet transport direction.

In the first embodiment, the length of the movable guide member 320 in the sheet transport direction (the length in a longitudinal direction) is less than that of the shortest sheet 101 that can be transported by the sheet transport section 300. If the length of the movable guide member 320 in the sheet transport direction is greater than that of the shortest sheet 101, the second transport rollers 303 cannot receive the sheet 101 advanced by the first transport rollers 302. This will cause a jam of the sheet 101. Additionally, the width of the movable guide member 320 in a direction perpendicular to the sheet transport direction should be less than that of the narrowest sheet 101 that can be transported by the sheet transport section 300. Alternatively, as shown in FIG. 18A, the width W1 of the movable guide member 320 may be greater than the width W2 of the widest sheet 101 which can be transported by the sheet transport section 300. In this case, side edges of the movable guide 320 do not come into contact with the sheet 101, thereby preventing the sheet 101 from being physically damaged by the side edges.

Figure 4:
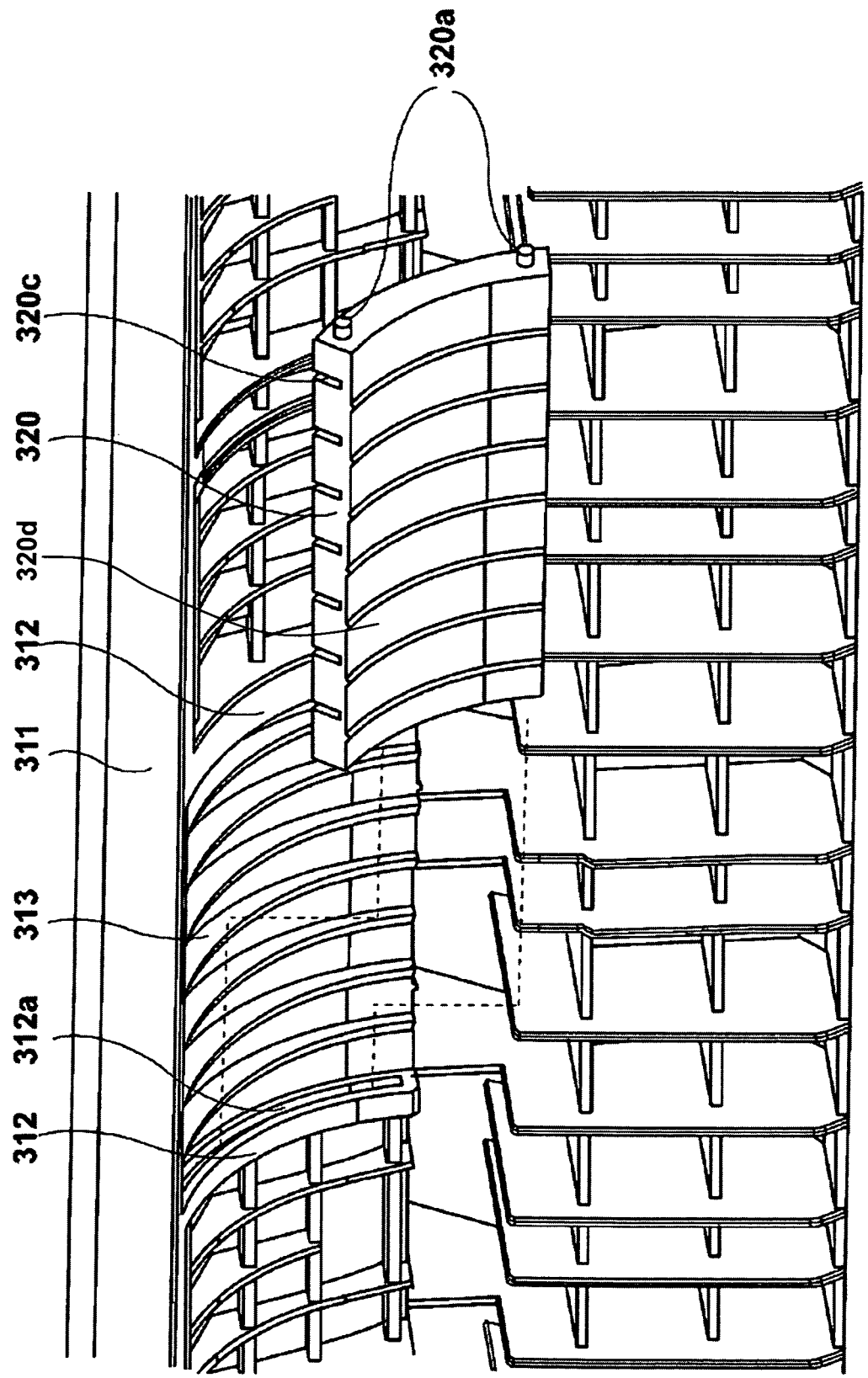
FIG. 4 is a perspective view illustrating how the movable guide member is mounted to the sheet transport section.

FIG. 4 is a perspective view illustrating how the movable guide member 320 is mounted to the sheet transport section 300. Referring to FIG. 4, the upper guide member 311 may be formed with a pair of supporting members 312, which are disposed at predetermined portions of the upper guide member 311 and support the movable guide member 320, so that the movable guide member 320 can slide in the sheet transport direction. The supporting members 312 may have curved slide grooves 312a, which are substantially parallel to the sheet transport path 304. The projections 320a of the movable guide member 320 are inserted into the slide grooves 312a so that the movable guide member 320 is slidably mounted to the upper guide member 311 and can move in the sheet transport direction. Note that the length of the front surface 320d of the movable guide member 320 in the sheet transport direction is less than that of the sheet transport surface 311a of the upper guide member 311.

Ribs 313, extending in the sheet transport direction, are provided on the sheet transport surface 311a at predetermined intervals measured in a width direction. Through the presence of the ribs 313, the sheet 101 can be smoothly advanced from the movable guide member 320 to the pair of second transport rollers 303. The ribs 313 slidably fit into the grooves 320c of movable guide member 320.

Figure 6A:
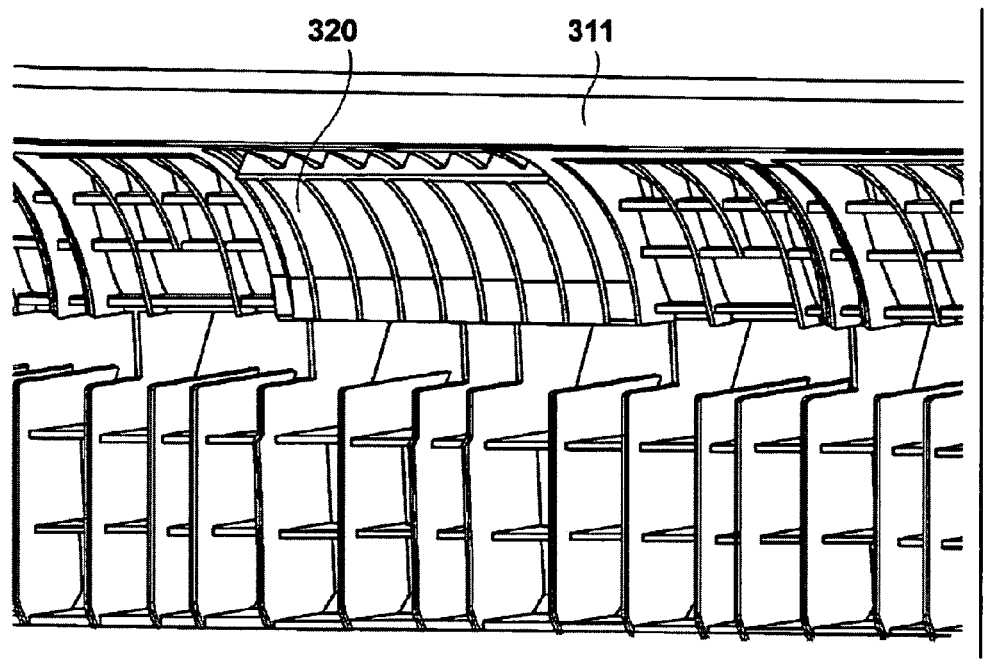
FIG. 6A is a perspective view illustrating the movable guide member when it is at the first position.
Figure 6B:
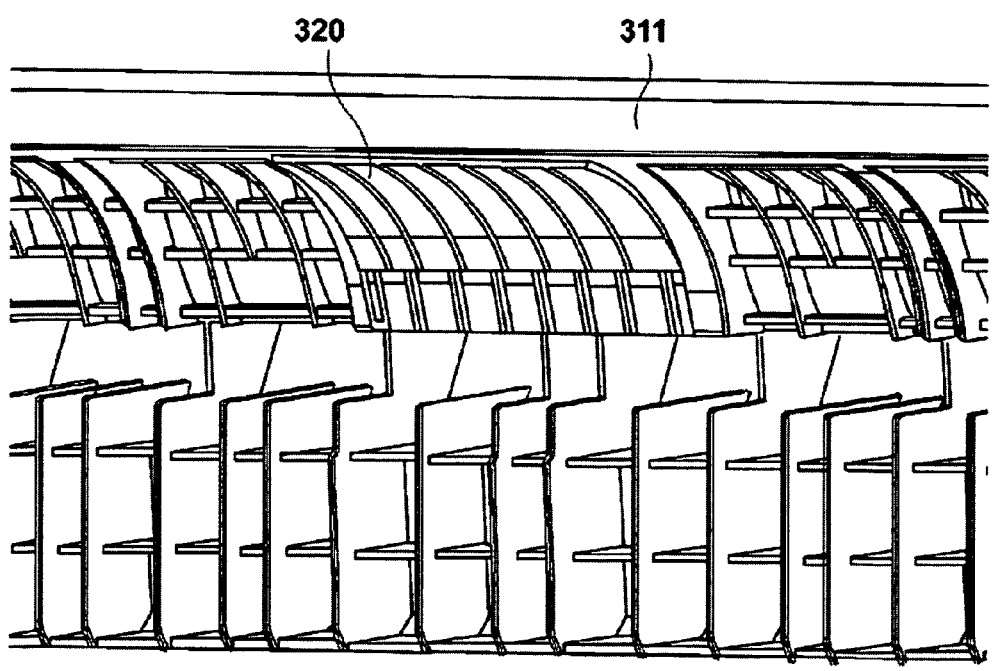
FIG. 6B is a perspective view illustrating the movable guide member when it is at the second position.

FIGS. 5A and 5B and FIGS. 6A and 6B are respectively side views and perspective views illustrating the movable guide member 320 when it is at a first position and at a second position. Stoppers 312b and 312c respectively at upstream and downstream ends of the slide groove 312a restrict the range of movement of the movable guide member 320. In the first embodiment, as shown in FIGS. 5A and 6A, the most upstream position of the movable guide member 320 where one of the projections 320a abuts the stopper 312b is defined as a first position. As shown in FIGS. 5B and 6B, the most downstream position of the movable guide member 320 where the other projection 320a abuts the stopper 312c is defined as a second position. The spring 330 urges the movable guide member 320 toward the first position all the time.

Referring to FIGS. 5A and 5B, the front surface 320d of the movable guide member 320 is slightly projected outward into the sheet transport path 304 from the sheet transport surface 311a of the upper guide member 311. Additionally, an upstream edge and a downstream edge of the movable guide member 320 are chamfered so that these edges do not project into the sheet transport path 304. This can prevent the front end of the sheet 101 fed from the sheet feeding section 200 from becoming stuck at the upstream edge of the movable guide member 320. Moreover, this can decrease the area of contact between the sheet 101 and the movable guide member 320 at the downstream edge and facilitate smooth removal of the sheet 101 from the movable guide member 320.

Figure 18B:
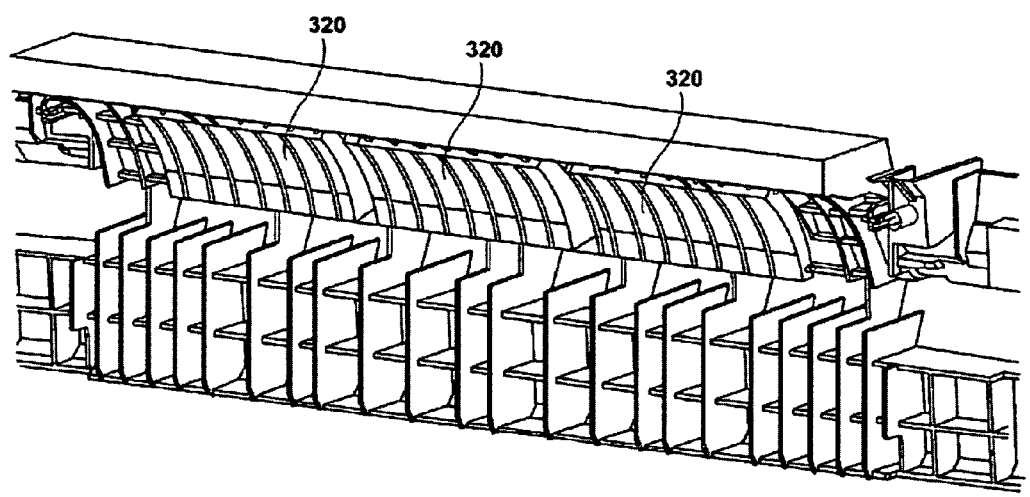
FIG. 18B is a perspective view illustrating another example of the sheet transport section, which has movable guide members in a direction perpendicular to the sheet transport direction.

In the first embodiment, as shown in FIGS. 6A and 6B, the movable guide member 320 is located substantially in the middle of the sheet transport path 304 in a direction perpendicular to the sheet transport direction. Alternatively, as shown in FIG. 18B, a plurality of the movable guide members 320 (three movable guide members 320 are shown in FIG. 18B by way of example) may be provided in a width direction, i.e. in a direction perpendicular to the sheet transport direction. The number of movable guide members 320 may be changed in accordance with the type of the sheet 101 that can be transported by the sheet transport section 300.

<Operation>

Figure 7B:
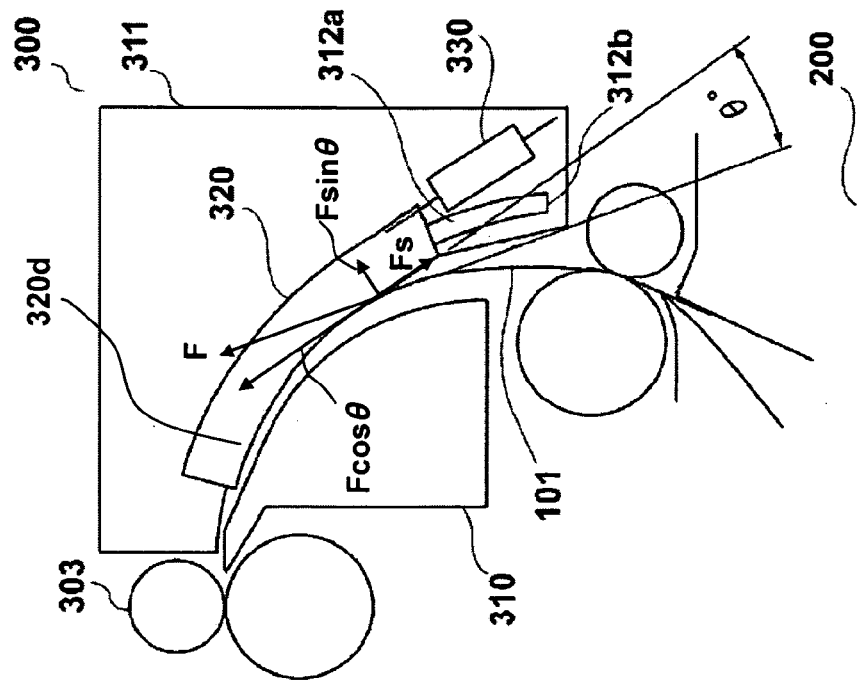
FIGS. 7A and 7B are side views illustrating the movement of the movable guide member when it transports a sheet.
Figure 7A:
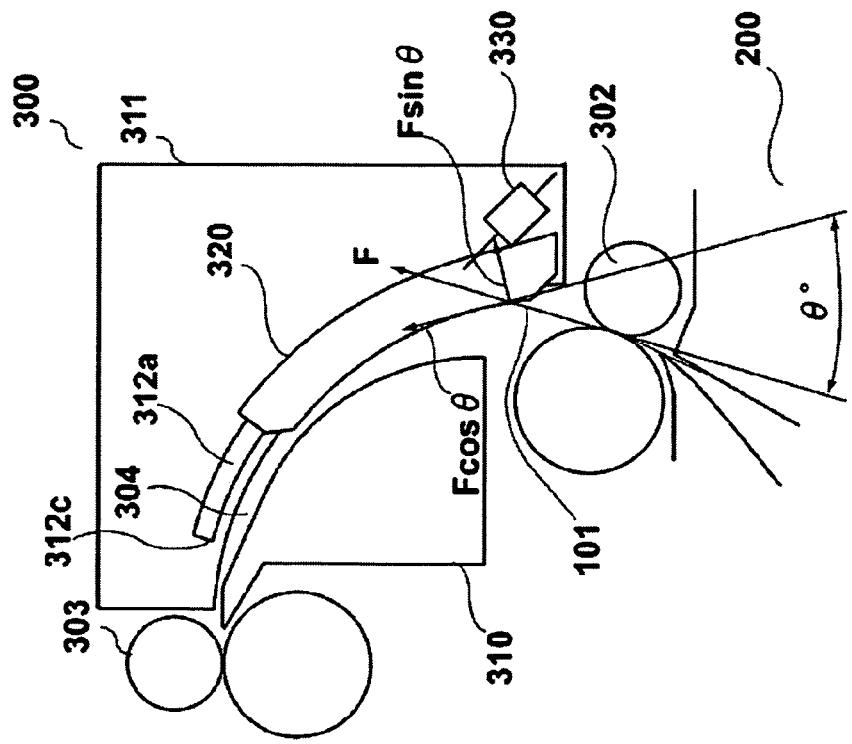

Next, the operation of the sheet transport section 300 according to the first embodiment will be described. FIGS. 7A and 7B are side views illustrating the movement of the movable guide member 320 when it transports the sheet 101.

Referring to FIG. 7A, when the sheet 101 fed from the sheet feeding section 200 is advanced to the sheet transport section 300 by the first transport rollers 302, the front end of the sheet 101 abuts the front surface 320d of the movable guide member 320. Here, it is assumed that the angle of abutment between the sheet 101 and the front surface 320d of the movable guide member 320 is $\theta$ (°), the transporting force produced by the first transport rollers 302 to transport the sheet 101 is F(N), the coefficient of static friction between the sheet 101 and the front surface 320d of the movable guide member 320 is $\mu$, and the urging force produced by the spring 330 is Fs(N). Note that the urging force Fs(N) acts in the tangential direction of the front surface 320d at the point where the sheet 101 abuts the front surface 320d.

If the angle of abutment $\theta$ is small, the following relationship is satisfied:

$$F \cos \theta - Fs > \mu F \sin \theta$$

When the aforementioned relationship is satisfied, the front end of the sheet 101 can slide on the front surface 320d. Consequently, as shown in FIG. 7A, the movable guide member 320 remains at the first position without moving and only the sheet 101 is advanced along the upper guide member 311.

If the angle of abutment $\theta$ is large, the following relationship is satisfied:

$$F \cos \theta - Fs < \mu F \sin \theta$$

When the aforementioned relationship is satisfied, the force defined by $\mu F \sin \theta - F \cos \theta$ is applied to the movable guide member 320. As shown in FIG. 7B, the force ($\mu F \sin \theta - F \cos \theta$) moves the movable guide member 320 in the sheet transport direction against the urging force Fs of the spring 330. The angle of abutment $\theta$ gradually becomes smaller as the movable guide member 320 becomes closer to the second position. When the relationship $F \cos \theta - Fs > \mu F \sin \theta$ is satisfied, the sheet 101 starts sliding on the front surface 320d of the movable guide member 320 and is advanced to the second transport rollers 303 by the transporting force F.

Once the sheet 101 starts sliding on the front surface 320d of the movable guide member 320, the force ($\mu F \sin \theta - F \cos \theta$) applied to the movable guide member 320 gradually decreases. When the urging force Fs of the spring 330 exceeds the force ($\mu F \sin \theta - F \cos \theta$), the movable guide member 320 starts moving to (returning to) the first position.

If the movable guide member 320 reaches the second position while keeping the relationship $F \cos \theta - Fs < \mu F \sin \theta$, the movement of the movable guide member 320 is stopped by abutting the stopper 312c of the upper guide member 311. At this time, the frictional force $\mu F \sin \theta$, associated with the transporting force F produced by the first transport rollers 302, acts on the front end of the sheet 101. However, since the angle of abutment $\theta$ is smaller at the second position than at the first position, the frictional force $\mu F \sin \theta$ acting on the sheet 101 at the second position is small. Therefore, the sheet 101 can slide smoothly on the movable guide member 320, thereby preventing occurrence of an abnormality, such as a sheet jam. In the first embodiment, from a standpoint of superior transportability, the angle of abutment θ of the sheet 101 at the second position may be set to be equal to or less than 30'.

Next, modifications of the first embodiment will be described with reference to the accompanying drawings.

<First and Second Modifications>

Figure 8:
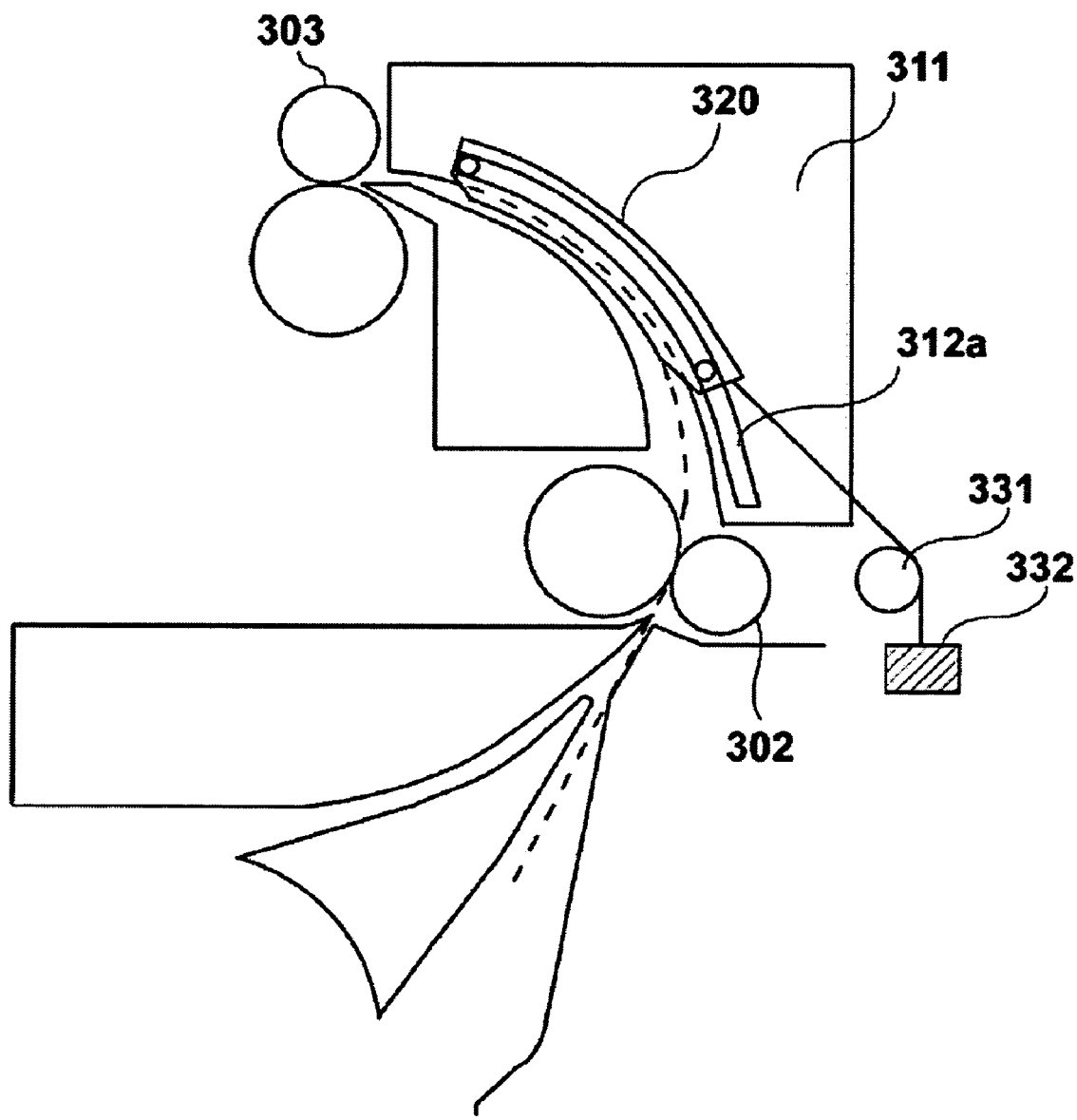
FIG. 8 is a side view illustrating a first modification of the sheet transport section of the first embodiment.

FIG. 8 is a side view illustrating a first modification of the sheet transport section 300 of the first embodiment, in which the spring 300 is replaced with a combination of a pulley 331 and a weight 332. The weight 332 produces the urging force Fs, which returns the movable guide member 320 to the first position, thus serving as the moving member.

Figure 9:
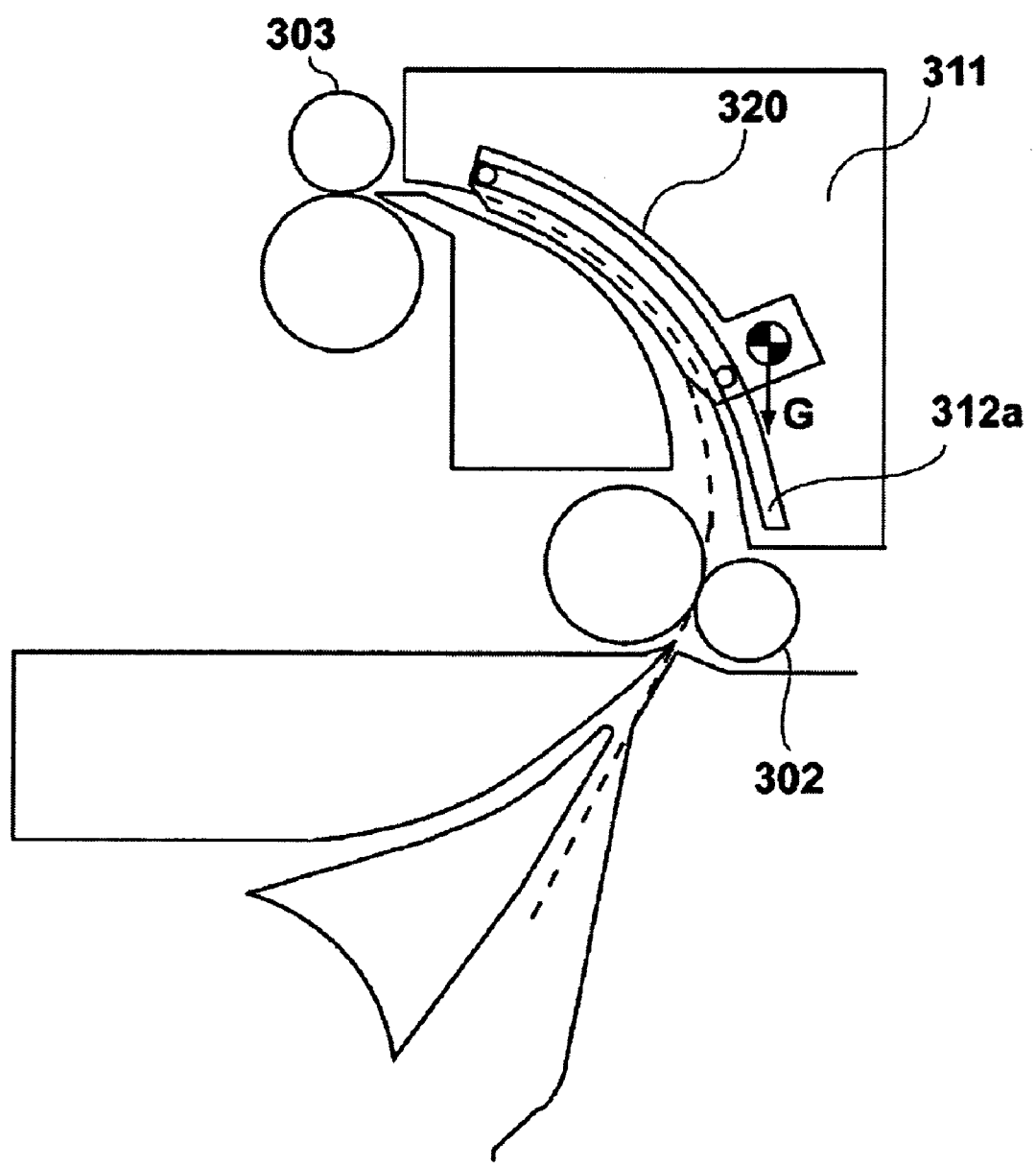
FIG. 9 is a side view illustrating a second modification of the sheet transport section of the first embodiment.

FIG. 9 is a side view illustrating a second modification of the sheet transport section 300 of the first embodiment, in which the movable guide member 320 is returned to the first position by its own weight G, thus serving as its own moving member.

Since these moving members, i.e. the weight 332 and the movable guide member 320 itself, utilize their weight to move the movable guide member 320, they can urge the movable guide member 320 at a substantially constant force regardless of the position of the movable guide member 320 on the sheet transport path 304.

<Third and Fourth Modifications>

Figure 10:
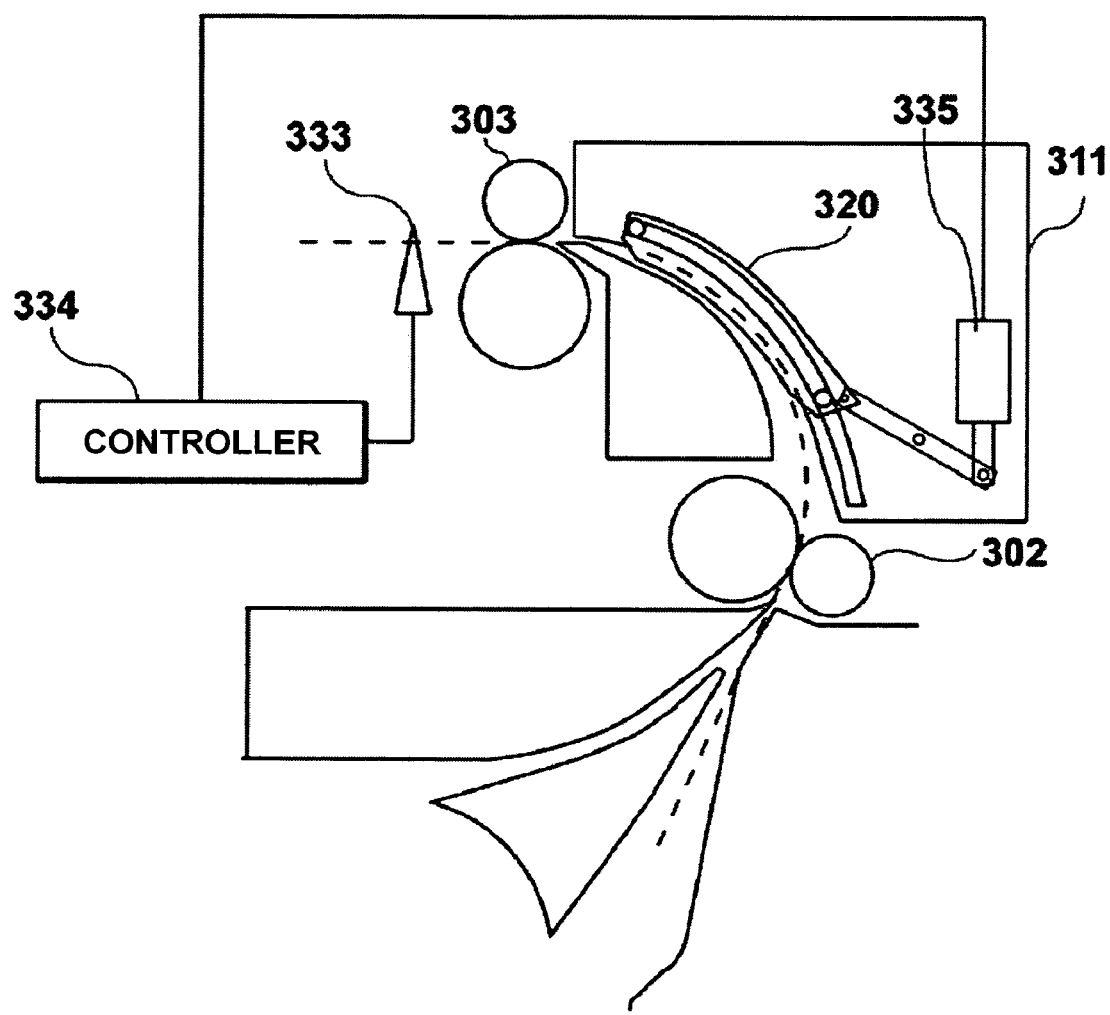
FIG. 10 is a side view illustrating a third modification of the sheet transport section of the first embodiment.

FIG. 10 is a side view illustrating a third modification of the sheet transport section 300 of the first embodiment, which includes a sheet detection sensor 333, a controller 334 and a solenoid 335. The solenoid 335 serves as the moving member. According to the position of the sheet 101, the controller 334 activates the solenoid 335 to move the movable guide member 320 to the first position. For example, the controller 334 activates the solenoid 335 when the sheet detection sensor 333, disposed downstream of the second transport rollers 303, detects the front end of the sheet 101.

Figure 11:
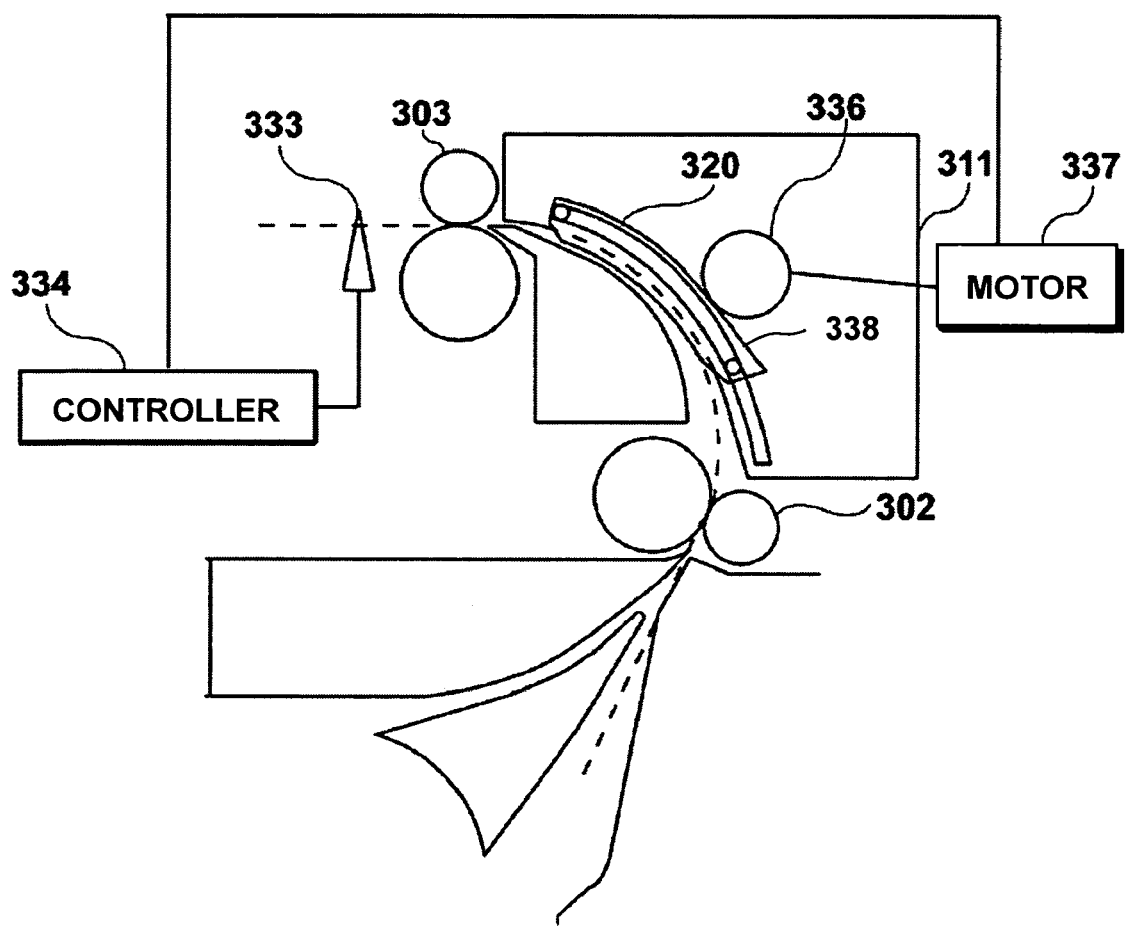
FIG. 11 is a side view illustrating a fourth modification of the sheet transport section of the first embodiment.

FIG. 11 is a side view illustrating a fourth modification of the sheet transport section 300 of the first embodiment, which includes a rack 338, a gear 336 and a motor 337 in addition to the sheet detection sensor 333 and the controller 334. The rack 338 is incorporated in the movable guide member 320 and is in mesh engagement with the gear 336. The motor 337 serves as the moving member. According to the position of the sheet 101, the controller 334 activates the motor 337 to move the movable guide member 320 to the first position through the gear 336 and the rack 338. For example, the controller 334 activates the motor 337 when the sheet detection sensor 333, disposed downstream of the second transport rollers 303, detects the front end of the sheet 101.

Note that the sheet detection sensor 333 may be disposed upstream of the first transport rollers 302 or between the first transport rollers 302 and the second transport rollers 303, as long as the sheet detection sensor 333 can detect the position of the sheet 101 on the sheet transport path 304. These moving members, i.e. the solenoid 335 and the motor 337, can move the movable guide member 320 to the first position with a constant force and can begin to move the movable guide member 320 with the same timing at all times.

<Fifth Modification>

Figure 12A:
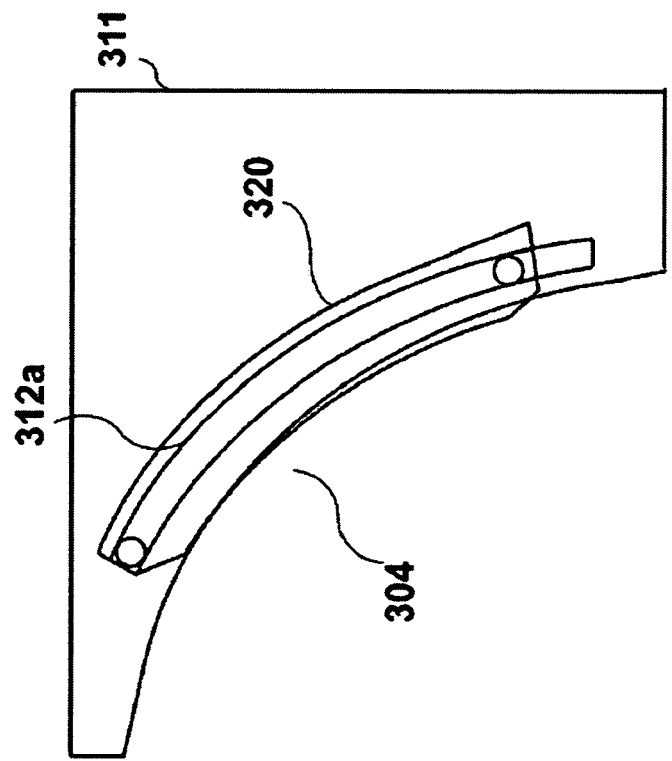
FIGS. 12A and 12B are side views illustrating a fifth modification of the sheet transport section of the first embodiment.
Figure 12B:
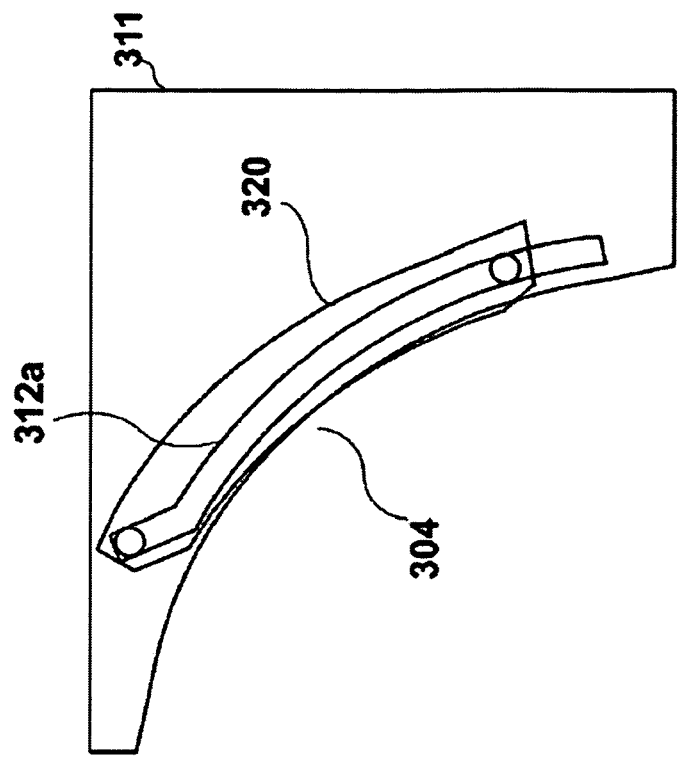

FIGS. 12A and 12B are side views illustrating a fifth modification of the sheet transport section 300 of the first embodiment. As shown in FIG. 12A, the slide grooves 312a of the upper guide member 311 is designed so that the slide grooves 312a gradually shift away from the sheet transport path 304, from the first position to the second position. As shown in FIG. 12B, the slide grooves 312a of the upper guide member 311 is designed so that the slide grooves 312a also bend in a direction away from the sheet transport path 304 in the vicinity of the second position. Thus, in the fifth modification, the movable guide member 320 gradually backs away from the sheet transport path 304 as the movable guide member 320 moves in the sheet transport direction. This can facilitate smooth removal of the sheet 101 from the movable guide member 320 in the vicinity of the second position.

<Sixth Modification>

Figure 13:
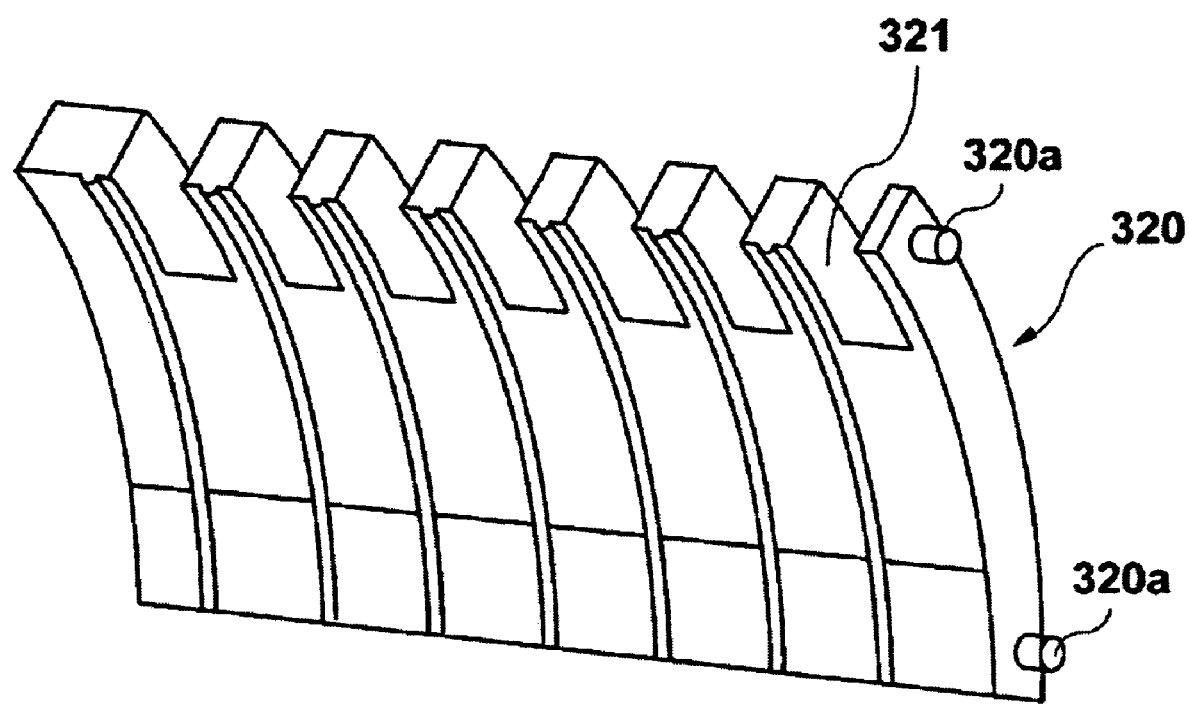
FIG. 13 is a perspective view illustrating a sixth modification of the movable guide member of the first embodiment.
Figure 14:
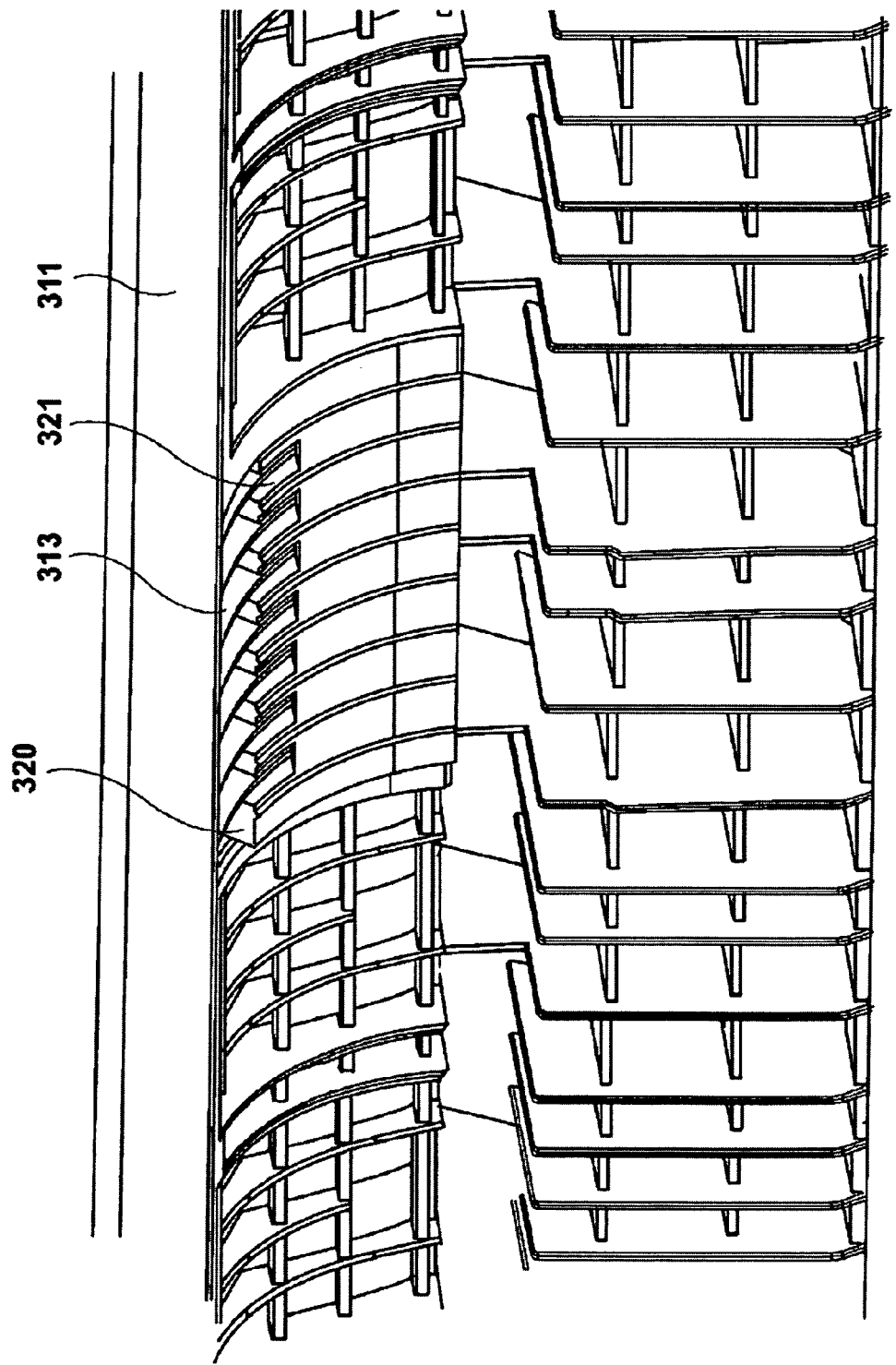
FIG. 14 is a perspective view illustrating the sheet transport section according to the sixth modification.

FIG. 13 is a perspective view illustrating a sixth modification of the movable guide member 320 of the first embodiment, in which cutouts 321 are formed at one end of the movable guide member 320. As shown in the perspective view of FIG. 14 illustrating the sheet transport section 300, the ribs 313 of the upper guide member 311 in the sixth modification project from between the cutouts 321 of the movable guide member 320 when the movable guide member 320 backs away from the sheet transport path 304 as described above in regard to the fifth modification. This can further facilitate smooth removal of the sheet 101 from the movable guide member 320.

<Seventh Modification>

Figure 15:
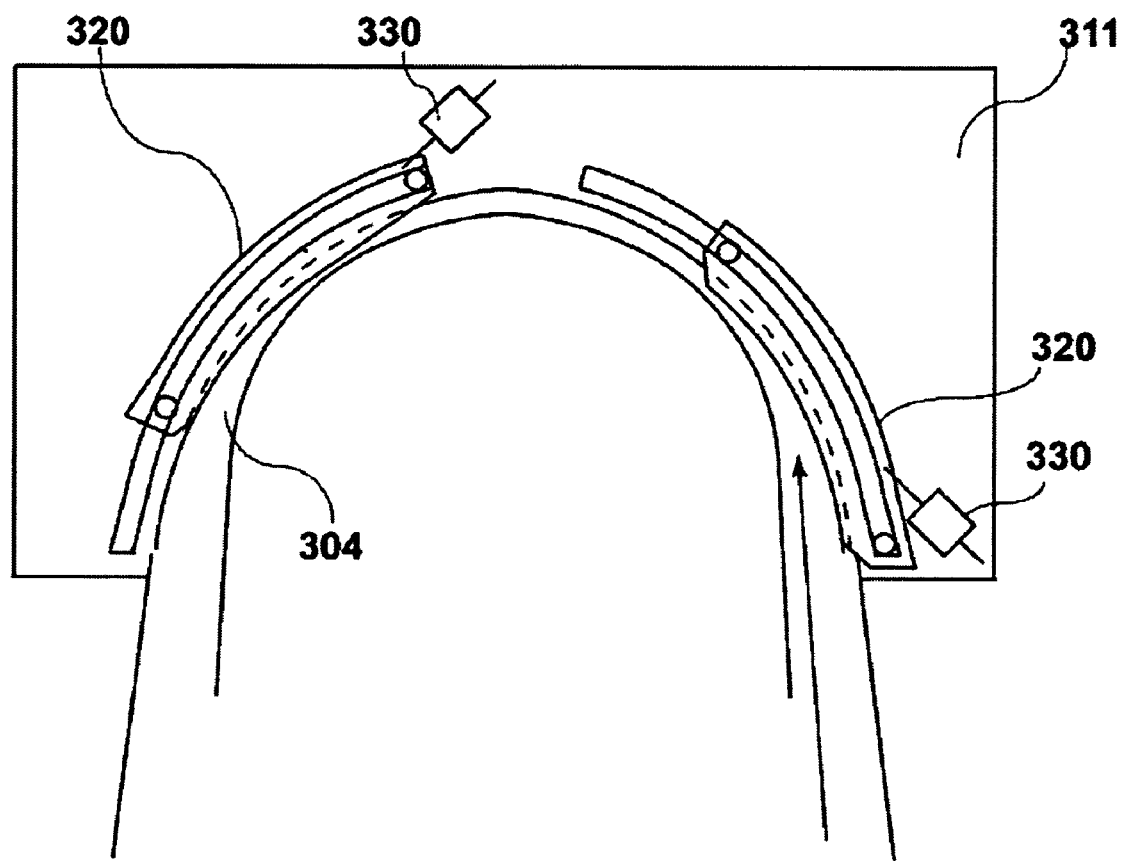
FIG. 15 is a side view illustrating a seventh modification of the sheet transport section of the first embodiment.

FIG. 15 is a side view illustrating a seventh modification of the sheet transport section 300 of the first embodiment. Referring to FIG. 15, if the upper guide member 311 is U-shaped so as to reverse the sheet transport direction, a plurality of the movable guide members 320 are provided along the sheet transport path 304, which also is U-shaped. These movable guide members 320 can provide stable transport of the sheet 101 on the sheet transport path 304.

<Eighth Modification>

Figure 16:
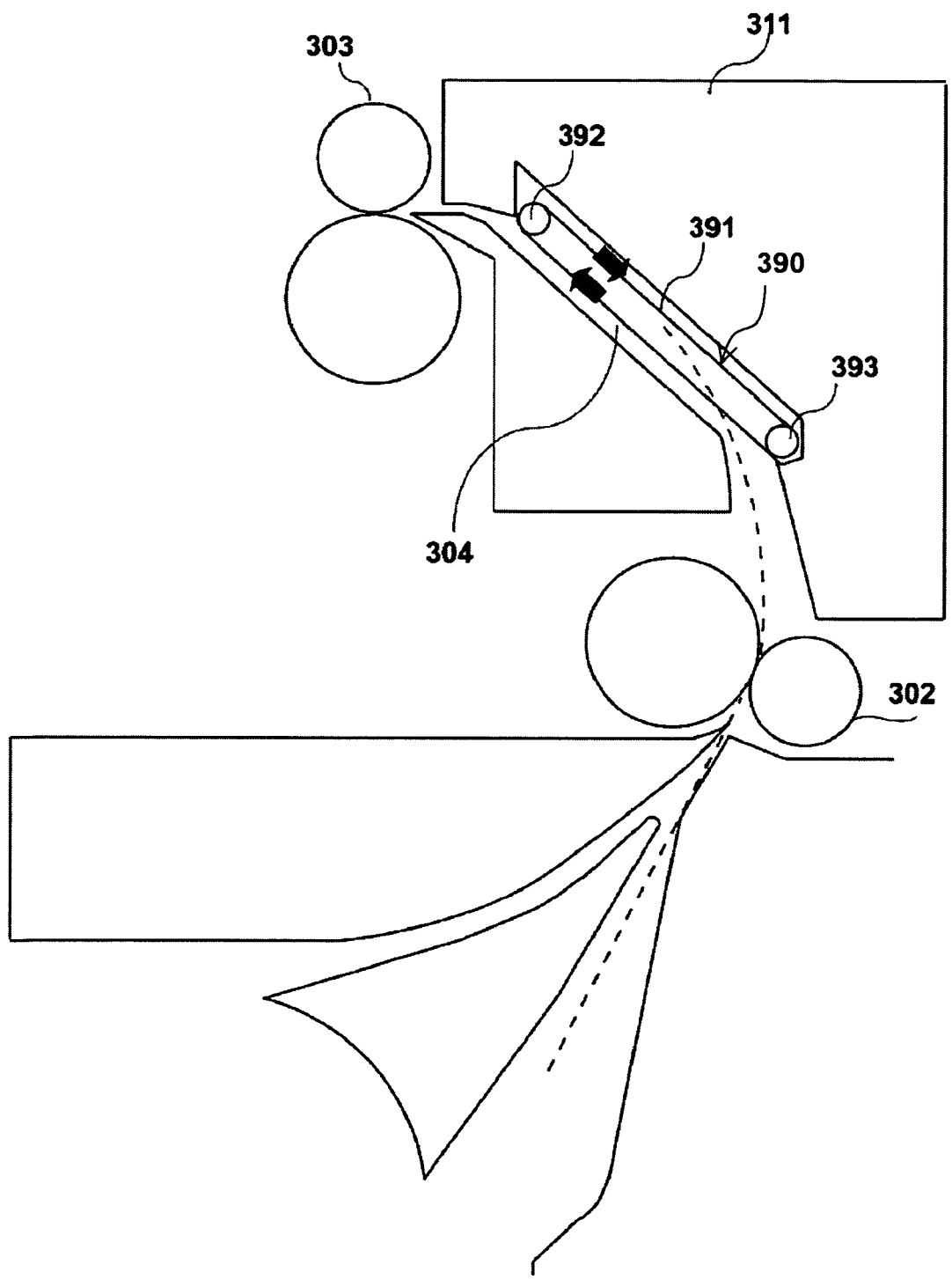
FIG. 16 is a side view illustrating an eighth modification of the sheet transport section of the first embodiment.

FIG. 16 is a side view illustrating an eighth modification of the sheet transport section 300 of the first embodiment, in which the movable guide member 320 is replaced with a belt mechanism 390. The belt mechanism 390 may include a belt 391, rollers 392 and 393. The belt 391 is entrained about the rollers 392 and 393. A one-way clutch, not shown, may be incorporated in one of the rollers 392 and 393 so that the rotational direction of the belt 101 can be limited in one direction shown by arrows. When the sheet 101 is advanced by the first transport rollers 302, the belt 391, the rollers 392 and 393 are rotated with the movement of the sheet 101. Thus, the belt mechanism 390 guides the sheet 101 to the second transport rollers 303 along the sheet transport path 304.

In the above case, the belt 391 is rotated with the movement of the sheet 101 advanced by the first transport rollers 302. Alternatively, one of the rollers 392 and 393 may be driven by a driving source, not shown, to drive the belt 391. The belt mechanism 390 can transport the sheet 101 smoothly regardless of the position of the sheet 101 when it is abutting the belt 391.

<Ninth Modification>

Figure 17:
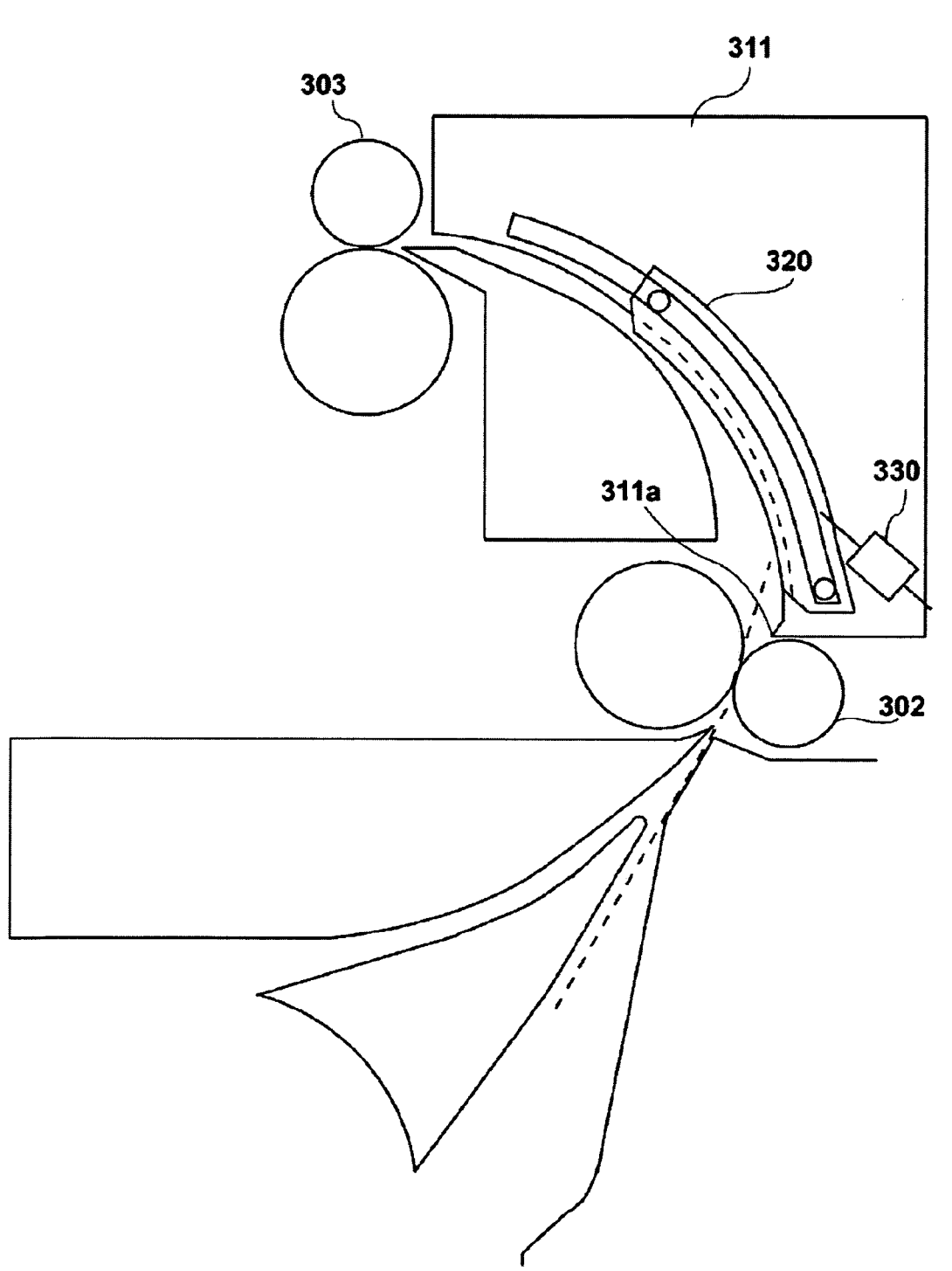
FIG. 17 is a side view illustrating a ninth modification of the sheet transport section of the first embodiment.

FIG. 17 is a side view illustrating a ninth modification of the sheet transport section 300 of the first embodiment, in which a protrusion 311a is formed at an upstream edge of the upper guide member 311 and is located in the vicinity of the first transport rollers 302. The protrusion 311a can surely guide the sheet 101 advanced by the first transport rollers 302 to the movable guide member 320.

As described above, in the first embodiment, the movable guide member 320 is slidably mounted to the upper guide member 311 along the sheet transport path 304. When the sheet 101 abuts the movable guide member 320, the movable guide member 320 moves with the movement of the sheet 101, thereby reducing the angle of abutment between the sheet 101 and the movable guide member 320 and reducing the frictional force acting on the front end of the sheet 101.

Therefore, the first embodiment can attain smooth and stable transport of the sheet 101 without occurrence of a sheet jam or other abnormality.

Second Embodiment

Figure 19:
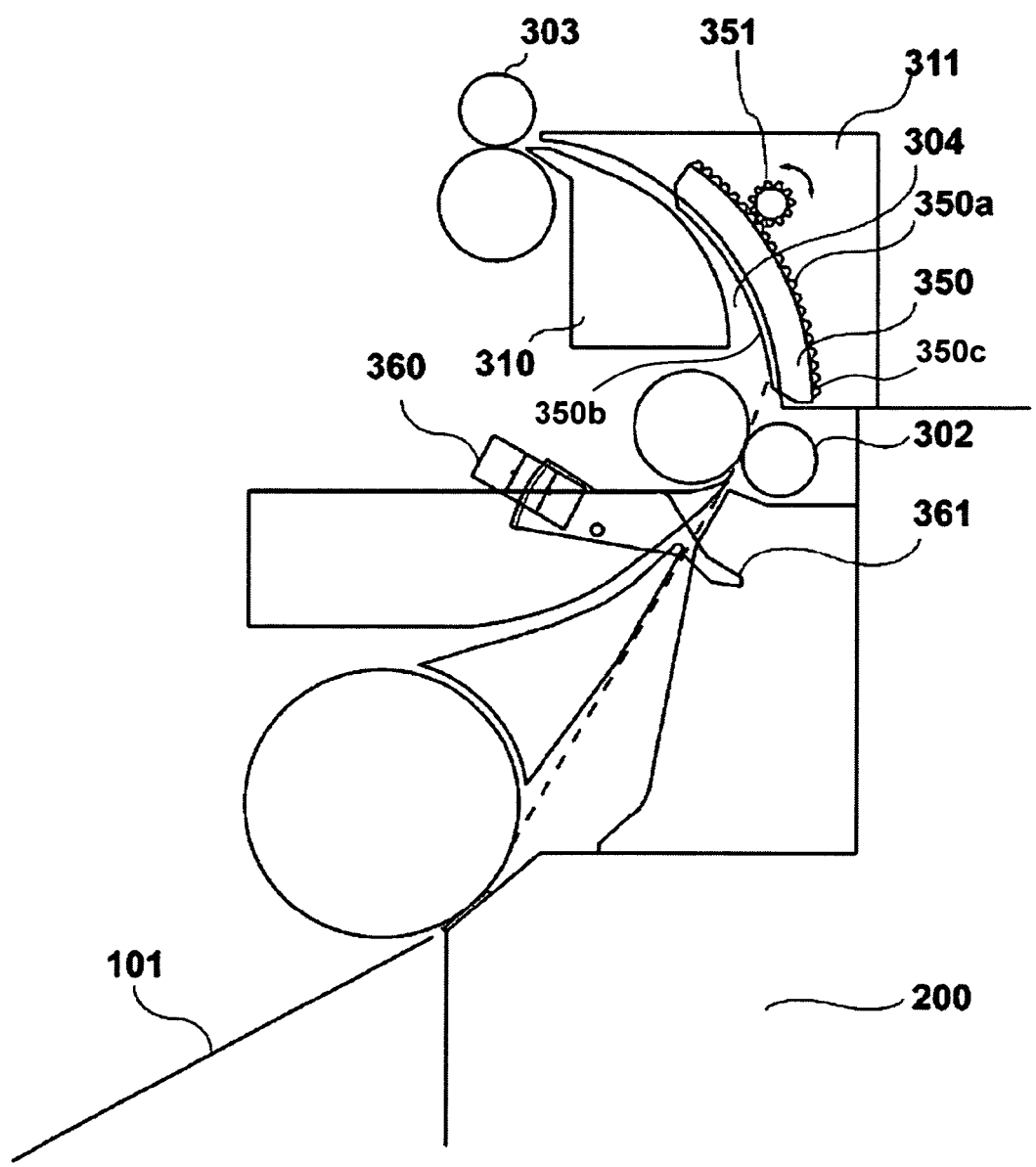
FIG. 19 is a side view illustrating a sheet transport section according to a second embodiment of the invention.
Figure 20:
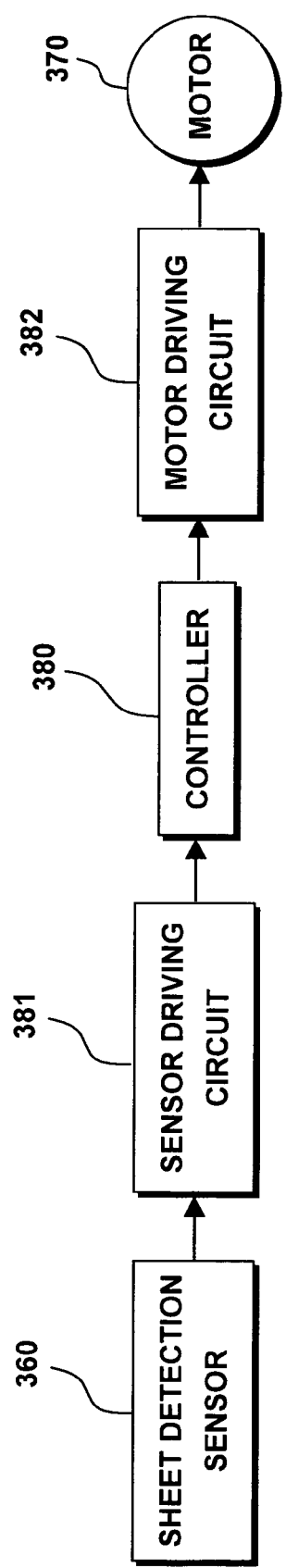
FIG. 20 is a block diagram illustrating a process for controlling the sheet transport section of the second embodiment.

FIG. 19 is a side view illustrating a sheet transport section of a second embodiment of the invention. FIG. 20 is a block diagram illustrating a process for controlling the sheet transport section of the second embodiment. The second embodiment differs from the first embodiment in that a movable guide member 350 is used in place of the movable guide member 320. Elements similar to those in the first embodiment have been given the same numerals and their description is omitted.

Referring to FIG. 19, a rack 350a, being in mesh engagement with a gear 351, is provided on a back surface 350c of the movable guide member 350. The gear 351 is rotatably mounted to the upper guide member 311 and is connected to a motor 370 through a gear train not shown. The motor 370 serves as a driving member. A sheet detection sensor 360 having a sensor lever 361 is disposed upstream of the first transport rollers 302.

Referring to FIG. 20, the sheet detection sensor 360 is connected to a controller 380 through a sensor driving circuit 381. The motor 370 is connected to the controller 380 through a motor driving circuit 382. The sensor driving circuit 381 supplies the sheet detection sensor 360 with a sensor driving current and the motor driving circuit 382 supplies the motor 370 with a motor driving current.

The sheet 101 fed from the sheet feeding section 200 comes into contact with the sensor lever 361 before the first transport rollers 302 and the position of the sheet 101 is detected by the sheet detection sensor 360. Then, the sheet 101 is advanced to the sheet transport path 304 by the first transport rollers 302 and the front end of the sheet 101 abuts a front surface 350b of the movable guide member 350 within the sheet transport path 304.

Output from the sheet detection sensor 360 is sent to the controller 380. The controller 380 receives the output from the sheet detection sensor 360 and calculates the time from when the sheet detection sensor 360 detects the front end of the sheet 101 until when the front end of the sheet 101 abuts the movable guide member 350. Specifically, the controller 380 calculates the time based on the transport speed of the sheet 101 and the distance between the position where the sheet detection sensor 360 detects the front end of the sheet 101 and the front surface 350b of the movable guide member 350. The controller 380 activates the motor 370 with a timing that corresponds to the timing at which the sheet 101 abuts the movable guide member 350, thereby moving the movable guide member 350 from the first position to the second position through the gear 351. The speed of movement of the movable guide member 350 may be set to be substantially the same as the speed at which the sheet 101 is transported.

The sheet 101 and the movable guide member 350 move to the second position together. As the movable guide member 350 is stopped at the second position, the sheet 101 continues to move to the second transport rollers 303 while sliding on the movable guide member 350 and on the upper guide member 311. When the sheet 101 reaches the second transport rollers 303, the controller 380 reverses the motor 370 so as to return the movable guide member 350 to the first position. The controller 380 calculates time (timing) at which the sheet 101 reaches the second transport rollers 303 based on the output from the sheet detection sensor 360.

The controller 380 may activate the motor 370 to move the movable guide member 350 to second position after a predetermined time has elapsed since the sheet 101 abutted the movable guide member 350. During the predetermined period of time, the sheet 101 is advanced by the first transport rollers 302. Therefore, the sheet 101 can be surely abutted with the movable guide member 350, thereby to transport it in a stable manner.

The speed of movement of the movable guide member 350 from the first position to the second position may be set lower than the transport speed of the sheet 101. In this case, the sheet 101 can be surely abutted with the movable guide member 350 as well as the aforementioned configuration.

The speed with which the movable guide member 350 is returned from the second position to the first position may be set higher than the transport speed of the sheet 101. In this case, the movable guide member 350 can return to the first position with sufficient time to receive a following sheet fed from the sheet feeding section 200.

In the second embodiment, the movable guide member 350 is electrically operated by the driving member such as the motor 370. Therefore, the second embodiment can further reduce the frictional force acting on the front end of the sheet 101 than the first embodiment and can attain smooth and stable transport of the sheet 101 without occurrence of an abnormality, such as a sheet jam, even if the sheet 101 is thin and has low rigidity.

While the first and second embodiments have been described with respect to a case where the medium transporting apparatus is applied to a sheet transport section for an image forming apparatus, the medium transporting apparatus of the invention may be applicable to a sheet discharging section and a duplex printing section for the image forming apparatus. Moreover, the medium transporting apparatus of the invention may be incorporated in a finisher attached to the image forming apparatus.

The invention being thus described, it will be obvious that the same may be varied in many ways. Such variations are not to be regarded as a departure from the sprit and scope of the invention, and all such modifications as would be obvious to one skilled in the art intended to be included within the scope of the following claims.

What is claimed is:

1. A medium transporting apparatus comprising:
a first transport member that transports a medium;
a movable guide member that comes into contact with and guides the medium transported by the first transport member along a medium transport path, the movable guide member being movable from a first position to a second position downstream of the first position in the medium transport direction; and
a fixed guide member that guides the medium, the movable guide member moving along a medium transport surface of the fixed guide member, the fixed guide member including a plurality of ribs that come into contact with the medium and extend in the medium transport direction,
wherein the movable guide member has a plurality of cutouts at one end thereof, the ribs of the fixed guide member projecting outward into the medium transport path from between the cutouts.

2. The medium transporting apparatus according to claim 1, further comprising:
a driving member that moves the movable guide member;
a medium detection sensor that detects the position of the medium on the medium transport path; and a controller that controls the driving member based on an output from the medium detection sensor.

3. The medium transporting apparatus according to claim 2, wherein the driving member is a motor.

4. The medium transporting apparatus according to claim 1, further comprising a moving member that urges the movable guide member toward the first position.

5. The medium transporting apparatus according to claim 4, wherein the moving member is selected from the group of consisting of a spring, a weight, a solenoid and a motor.

6. The medium transporting apparatus according to claim 1, wherein the length of the movable guide member in the medium transport direction is less than the length of the shortest medium that can be transported by the medium transporting apparatus.

7. The medium transporting apparatus according to claim 1, wherein the movable guide member includes a plurality of ribs that come into contact with the medium and extend in the medium transport direction.

8. The medium transporting apparatus according to claim 1, wherein at least part of the movable guide member is adapted to back away from the medium transport path.

9. The medium transporting apparatus according to claim 1, wherein at least part of the movable guide member projects outward into the medium transport path from the medium transport surface of the first fixed guide member.

10. The medium transporting apparatus according to claim 1, wherein an upstream edge of the first fixed guide member projects toward the first transport member.

11. The medium transporting apparatus according to claim 1, wherein the movable guide member is a first movable guide member, the medium transporting apparatus further comprises a second movable guide member that also comes into contact with and guides the medium transported by the first transport member along the medium transport path.

12. The medium transporting apparatus according to claim 1, wherein the first position is a position where a front end of the medium transported by the first transport member abuts the movable guide member.

13. A medium transporting apparatus comprising:
a first transport member that transports a medium;
a movable guide member that comes into contact with and guides the medium transported by the first transport member along a curved medium transport path, the movable guide member being movable from a first position to a second position downstream of the first position in the medium transport direction, the movable guide member being plate-like and having a curved surface corresponding to the medium transport path;
a first fixed guide member that guides the medium, wherein the movable guide member moves along a medium transport surface of the first fixed guide member, at least a part of the movable guide member projects outward into the medium transport path from the medium transport surface of the first fixed guide member; and
a second fixed guide member that opposes the movable guide member across the medium transport path,
wherein a distance between the movable guide member and the second fixed guide member in a direction perpendicular to the medium transport direction gradually decreases along the medium transport direction.

14. The medium transporting apparatus according to claim 13, wherein the first position is a position where a front end of the medium transported by the first transport member abuts the movable guide member.

15. The medium transporting apparatus according to claim 13, further comprising a moving member that urges the movable guide member toward the first position.

16. The medium transporting apparatus according to claim 15, wherein the moving member is selected from the group of consisting of a spring, a weight, a solenoid and a motor.

17. The medium transporting apparatus according to claim 13, further comprising:
a driving member that moves the movable guide member;
a medium detection sensor that detects the position of the medium on the medium transport path; and
a controller that controls the driving member based on an output from the medium detection sensor.

18. The medium transporting apparatus according to claim 13, wherein the driving member is a motor.

19. The medium transporting apparatus according to claim 13, wherein the length of the movable guide member in the medium transport direction is less than the length of the shortest medium that can be transported by the medium transporting apparatus.

20. The medium transporting apparatus according to claim 13, wherein the movable guide member includes a plurality of ribs that come into contact with the medium and extend in the medium transport direction.

21. The medium transporting apparatus according to claim 13, wherein at least part of the movable guide member is adapted to back away from the medium transport path.

22. The medium transporting apparatus according to claim 13, wherein at least part of the movable guide member projects outward into the medium transport path from the medium transport surface of the first fixed guide member.

23. The medium transporting apparatus according to claim 13, wherein an upstream edge of the first fixed guide member projects toward the first transport member.

24. The medium transporting apparatus according to claim 13, wherein the movable guide member is a first movable guide member, the medium transporting apparatus further comprises a second movable guide member that also comes into contact with and guides the medium transported by the first transport member along the medium transport path.

25. An image forming apparatus comprising:
the medium transporting apparatus according to claim 13;
an image-forming section that forms a toner image;
a transfer unit that transfers the toner image to the medium transported by the medium transporting apparatus; and
a fixing unit that fuses the toner image transferred to the medium into a permanent image.

26. An image forming apparatus comprising:
the medium transporting apparatus according to claim 1;
an image-forming section that forms a toner image;
a transfer unit that transfers the toner image to the medium transported by the medium transporting apparatus; and
a fixing unit that fuses the toner image transferred to the medium into a permanent image.

* * * * *